April 30, 1940.  J. W. COREY ET AL  2,198,863
ELECTRIC MOTOR DRIVE
Filed Oct. 18, 1938
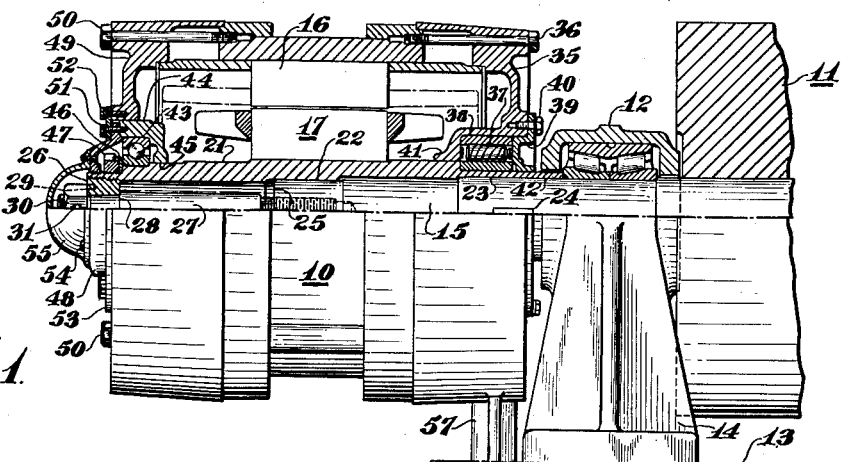
INVENTOR.
James W. Cory &
Alexander M. MacCutcheon.
BY
Stoodling and Krost
ATTORNEY.

Patented Apr. 30, 1940

2,198,863

UNITED STATES PATENT OFFICE 2,198,863

ELECTRIC MOTOR DRIVE

James W. Corey and Alexander M. MacCutcheon, Cleveland, Ohio, assignors to Reliance Electric and Engineering Company, a corporation of Ohio Application October 18, 1938, Serial No. 235,636

13 Claims. (Cl. 172—36)

Our invention relates in general to electric motor drives, and more particularly to self-aligning electric motor drives.

When an electric motor is connected to transmit power to a driven machine or rotating equipment, it is customary to provide the motor with feet which carry the weight of the motor and which prevent the rotation of the motor frame when the motor is transmitting power. If the foundation of the motor is independent from the foundation of the driven machine or rotating equipment, the motor, in order to take care of mis-alignment, is connected to the driven machine or rotating equipment through a flexible coupling, gearing, or a belt drive. In some installations, the electric motor and the driven machine or rotating equipment are mounted upon the same bed plate, and with this construction it is possible to eliminate one of the motor bearings supporting one end of the motor armature or rotor through a solid coupling. Experience shows that this construction has the disadvantage of three bearings which have to be accurately lined up and maintained to prevent damage to the motor. In other installations, the rotor or armature of the electric motor has been mounted to a shaft extension of the driven machine or rotating equipment, but with the motor frame supported on its own feet. With this latter construction, a misalignment of the motor frame with the frame of the driven machine or rotating equipment causes a loss of the air gap which inevitably results in damage to the motor. Even though the motor frame be supported from the same base plate as the driven machine or rotating equipment, yet the shaft is apt to become warped, resulting in a mis-alignment of, and rubbing between, the relatively movable parts of the electric motor. The amount of the warping of the shaft need only to be very small to cause considerable damage to the relatively movable parts of the electric motor, because the clearance of the air gap is usually quite close.

Therefore, an object of our invention is the provision of an electric motor drive which is self-aligning and which maintains the proper clearance of the air gap of the electric motor, regardless of the condition of the foundation for the driven machine or rotating equipment.

Another object of our invention is the provision of mounting an electric motor upon an overhanging shaft extension of the driven machine or rotating equipment and of permitting the motor as a whole to follow any small bending or deflecting movements of the shaft to maintain the relationship of the air gap unchanged at all times.

Another object of our invention is to provide for forcibly sliding a sleeve of the electric motor on or off of the shaft extension.

Another object of our invention is the freedom from shocks on the driven parts when power is thrown on the motor.

Other objects and a fuller understanding of my invention may be had by referring to the following description and claims, taken in conjunction with the accompanying drawing, in which:

Figure 1 illustrates an embodiment of our invention shown in side elevation, with electric motor shown partly in sections;

Figure 2 shows a plurality of driven machines or rotating equipment, each being driven by our self-aligning electric motor;

Figure 3 shows an end view of the embodiment shown in Figure 1;

Figure 4 shows a cross-sectional and enlarged view of the central parts of the electric motor which is to be mounted upon the over-hanging shaft extension of the driven member or rotating equipment; and Figure 5 shows a modified form of that part of the invention which constrains the frame of the electric motor against rotation.

With reference to Figures 1 and 2 of the drawing, our self-aligning electric motor is indicated by the reference character 10 and is arranged to be mounted upon an over-hanging shaft 15 of the driven member or rotating equipment indicated generally by the reference character 11. As shown, each end of the driven members 11 may be suitably supported by a bearing 12, carried by a suitable pedestal 14 mounted upon an I-beam 13 constituting the foundation for the driven machine or rotating equipment 11 and the electric motor 10. While we have illustrated our invention as being applied for driving individually a series of rolls, such as employed in the rolling or shaping of steel products, yet it is to be clearly understood that our invention applies equally well to the driving of rotating equipment of all kinds having an overhanging shaft relatively mounted in bearing supports.

The electric motor 10 may be of any suitable construction and comprises an outer relatively movable part 16 and an inner relatively movable part 17. It is to be clearly understood that our motor is not limited to an induction squirrel cage type as shown in the drawing, but may include motors of all kinds. The inner relatively movable part 17 of the electric motor is non-rotatively connected to a sleeve 21 which snugly fits the over-hanging shaft 15 of the driven member 11. The over-hanging shaft 15 and the sleeve 21 have two press fit portions 22 and 23, the press fit portion 22 being near the outer end 25 of the over-hanging shaft and the press fit portion 23 being near the right-hand end of the electric motor. The press fit portion 23 is larger than the press fit portion 22 so that the sleeve may be slid over the overhanging shaft 15 a considerable distance before it tends to make a snug engagement. The sleeve 21 is non-rotatively connected to the over-hanging shaft 15 by means of a key 24 which interfits between the shaft and the sleeve at the right-hand end of the motor. To facilitate the mounting or dismounting of the sleeve 21 upon the over-hanging shaft 15, and particularly when the sleeve makes a snug engagement therewith, we employ an extension member 27 which threadably engages at its right-hand end the over-hanging shaft 15 and which may be turned at its left-hand end by means of a suitable wrench engaging a nut 30 pinned or otherwise fastened to the extension member 27 by means of a pin 31. The extension member 27 is provided with a reduced portion which rotatively fits within a threaded internal collar 26 threadably engaged to the outer end of the sleeve 21. By means of this construction, the reduced portion of the extension member 27 presents a shoulder 28 which abuts against the right-hand side of the threaded internal collar 26. The nut 30 abuts upon the left-hand side of the threaded internal collar 26. The threaded internal collar 26 may be screwed into the end of the sleeve 21 by means of a tool which fits into the recesses 29 in the outer face of the threaded collar.

The extension member 27, threaded collar 26 and the nut 30 are preferably mounted into the sleeve 21 before the motor is arranged for mounting upon the over-hanging shaft 15. Therefore, in mounting the electric motor upon over-hanging shaft 15, it is only necessary to slide the sleeve 15 over the shaft until the press fit portions 22 and 23 resist the further insertion of the sleeve. At this point the nut 30 is turned, causing the threads on the right-hand end of the extension member 27 to threadably engage the threaded opening in the end of the over-hanging shaft 15 and drawing the sleeve 21 forcibly over the press fit portion 22 and 23. At the same time, the key way in the sleeve is guided to fit the key 24 in the right-hand end of the shaft. To dismount the motor the nut may be turned in the reverse direction. By the above described construction, the entire motor 10 may be assembled upon or disassembled from the extension shaft 15 by the mere turning of the nut 30.

In order to provide rotation of the outer relatively movable part 16 upon the inner relatively movable part 17 of the electric motor, we provide for rotatively mounting the outer relatively movable part 16 upon the sleeve 21 by means of roller bearing means 37 and ball bearing means 43, each comprising an inner and outer race. The outer race of the roller bearing means 37 fits in a recess 38 provided in the left-hand end bell 35 which is connected to the central frame structure of the electric motor by means of stud bolts 36. The inner race of the roller bearing means 37 is arranged to surround a reduced portion of the sleeve 21. The roller bearing means 37 is held in position by means of a bearing end plate 39 which may be suitably bolted or otherwise fastened to the end bell 35 by cap screws 40. The rearward portion of the recess 38 and the portion 42 of the end plate 39 are arranged to rotate about the sleeve 21 with a close clearance to prevent lubricant from leaking out along the sleeve.

The inner race of the ball bearing means 43 engages a reduced portion of the sleeve at the left-hand end thereof, and is secured in position by means of a lock washer 46 and a nut 47. The outer race of the ball bearing means 43 is arranged to fit in a bearing cartridge 44 having a rearward portion 45 arranged to rotate at close clearance with reference to the sleeve 21 to keep lubricant from leaking out along the sleeve 21. The roller bearing means 43 may be enclosed by an end plate 48 which is connected to the cartridge 44 by means of cap screws 51. The right-hand end bell 49, which is connected to the central portion of the outer relatively movable part 16 by stud bolts 50, is non-rotatively connected to the cartridge 44 by means of an end plate 53 and the screws 51 and 52. As illustrated, the nut 30 may be enclosed within an end plate 55 held in position by means of screws 54.

In order to transmit power to the driven member 11, the outer relatively movable part 16 of the electric motor is arranged to be constrained against rotation. Any suitable means may be employed to prevent the rotation of the outer relatively movable part 16, and as illustrated in Figure 3, we employ a depending leg 57 suitably connected, such as by welding, to the outer frame of the electric motor. The lower end of the depending leg 57 is stationed between two compression springs 63 and 64 carried by a clamp means 59 which has two flanges 60 and 61 for engaging the outer end of the springs. The clamp means 59 may be mounted to any suitable anchorage, such as to the side of the web of the I-beam 13 by means of screw bolts 65, as indicated in Figure 1. The top flange of the I-beam may be cut away such as indicated by the reference character 58 to allow the depending leg 57 to extend between the two springs 63 and 64. While we have shown the use of compression springs 63 and 64, it is to be understood that tension springs may be used by suitably connecting them to the flanges 60 and 61 on the clamp means 59, or to any other suitable anchorage.

In Figure 5, we show another embodiment of the constraining means, in that the depending leg 57 is positioned between two rubber or composition blocks 68 and 69 held in position by a clamp 70 suitably connected by means of bolts 71 to the web of the I-beam 13. The use of the springs 63 and 64 or the resilient rubber blocks 68 and 69 is such that they absorb the shock of the moving parts when the motor is set in operation.

Inasmuch as the complete motor is carried solely by the over-hanging shaft 15 and inasmuch as the depending leg 57 is free to move vertically between the springs 63 and 64 or the rubber blocks 68 and 69, the motor is free to follow the small bending or deflecting movements of the shaft 15 and always maintain the proper clearance of the air gap between the relatively movable parts 16 and 17 of the electric motor. Thus, all possible damage to the motor is obviated.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. The combination with a driven member having a shaft and bearing support means rotatively supporting the shaft with an extension thereof over-hanging the said bearing support means, of an electric motor having outer and inner relatively movable parts, means for removably mounting the electric motor to one side of the bearing support means and supporting the electric motor from the over-hanging shaft, bearing means for rotatively supporting the outer relatively movable part upon the inner relatively movable part, and means for constraining the outer relatively movable part against rotation.

2. The combination with a driven member having a shaft and bearing support means rotatively supporting the shaft with an extension thereof over-hanging the said bearing support means, of an electric motor having outer and inner relatively movable parts, said inner relatively movable part having a sleeve, means for non-rotatively mounting the sleeve upon the said over-hanging shaft extension, bearing means surrounding the sleeve and rotatively supporting the outer relatively movable part upon the sleeve, and means for constraining the outer relatively movable part against rotation.

3. The combination with a driven member having a shaft and bearing support means rotatively supporting the shaft with an extension thereof over-hanging the said bearing support means, of an electric motor having outer and inner relatively movable parts, said inner relatively movable part having a sleeve, means for non-rotatively mounting the sleeve upon the said over-hanging shaft extension, bearing means surrounding the sleeve upon opposite sides of the inner relatively movable part and rotatively supporting the outer relatively movable part upon the sleeve, and means for constraining the outer relatively movable part against rotation.

4. The combination with a driven member having a shaft and bearing support means rotatively supporting the shaft with an extension thereof over-hanging the said bearing support means, of an electric motor having outer and inner relatively movable parts, said inner relatively movable part having a sleeve, means for non-rotatively mounting the sleeve upon the said over-hanging shaft extension, bearing means surrounding the sleeve upon opposite sides of the inner relatively movable part and rotatively supporting the outer relatively movable part upon the sleeve, and resilient means for constraining the outer relatively movable part against rotation.

5. The combination with a driven member having a shaft and bearing support means rotatively supporting the shaft with an extension thereof over-hanging the said bearing support means, of an electric motor having outer and inner relatively movable parts, said inner relatively movable part having a sleeve, means for non-rotatively mounting the sleeve upon the said over-hanging shaft extension, bearing means surrounding the sleeve upon opposite sides of the inner relatively movable part and rotatively supporting the outer relatively movable part upon the sleeve, and spring means for constraining the outer relatively movable part against rotation.

6. The combination with a driven member having a shaft and bearing support means rotatively supporting the shaft with an extension thereof over-hanging the said bearing support means, of an electric motor having outer and inner relatively movable parts, said inner relatively movable part having a sleeve, means for non-rotatively mounting the sleeve upon the said over-hanging shaft extension, bearing means surrounding the sleeve upon opposite sides of the inner relatively movable part and rotatively supporting the outer relatively movable part upon the sleeve, and rubber means for constraining the outer relatively movable part against rotation.

7. The combination with a driven member having a shaft and bearing support means rotatively supporting the shaft with an extension thereof over-hanging the said bearing support means, of an electric motor having outer and inner relatively movable parts, supported solely by the said over-hanging shaft extension, and means for constraining one of said relatively movable parts against rotation.

8. The combination with a driven member having a shaft and bearing support means rotatively supporting the shaft with an extension thereof over-hanging the said bearing support means, of an electric motor having outer and inner relatively movable parts, said inner relatively movable part having a sleeve fitting on the said over-hanging shaft extension, said sleeve extending beyond the end of the said over-hanging shaft extension, an internal collar threadably engaging the inside of the extended part of the sleeve, an extension member having a shoulder abutting against and a reduced portion fitting in and extending beyond the collar, a pinned nut secured to the extended reduced portion of the extension member on the opposite side of the collar from the shoulder, the inner end of the extension member threadably engaging the end of the said over-hanging shaft extension, bearing means surrounding the sleeve and rotatively supporting the outer relatively movable part upon the sleeve, and means for constraining the outer relatively movable part against rotation.

9. The combination with a driven member having a shaft and bearing support means rotatively supporting the shaft with an extension thereof over-hanging the said bearing support means, of an electric motor having outer and inner relatively movable parts, said inner relatively movable part having a sleeve fitting on the said over-hanging shaft extension, means interconnecting the sleeve and the said over-hanging shaft extension for forcing the sleeve on or off the said over-hanging shaft extension, bearing means surrounding the sleeve and rotatively supporting the outer relatively movable part upon the sleeve, and means for constraining the outer relatively movable part against rotation.

10. The combination with a driven member having a shaft and bearing support means rotatively supporting the shaft with an extension thereof over-hanging the said bearing support means, of an electric motor having outer and inner relatively movable parts, means for removably mounting the electric motor to one side of the bearing support means and supporting the electric motor from the over-hanging shaft, bearing means for rotatively supporting the outer relatively movable part upon the inner relatively movable part, and resilient means for constraining the outer relatively movable part against rotation.

11. The combination with a driven member having a shaft and bearing support means rotatively supporting the shaft with an extension thereof over-hanging the said bearing support means, of an electric motor having outer and inner relatively movable parts, means for removably mounting the electric motor to one side of the bearing support means and upon the over-hanging shaft extension, said mounting means comprising sleeve means for removably and non-rotatively mounting said inner relatively movable part to the over-hanging shaft extension, means interconnecting the sleeve means and the said over-hanging shaft extension for forcing the sleeve means on or off the said over-hanging shaft extension, bearing means for rotatively supporting the outer relatively movable part upon the inner relatively movable part, and means for constraining the outer relatively movable part against rotation.

12. The combination with a driven member having a shaft and bearing support means rotatively supporting the shaft with an extension thereof over-hanging the said bearing support means, of an electric motor having outer and inner relatively movable parts, supported substantially solely by the said over-hanging shaft extension, means for removably mounting the electric motor upon the said over-hanging shaft extension and means for constraining one of said relatively movable parts against rotation.

13. The combination with a driven member having a shaft and bearing support means rotatively supporting the shaft with an extension thereof over-hanging the said bearing support means, of an electric motor having outer and inner relatively movable parts, supported substantially solely by the said over-hanging shaft extension, means for removably mounting the electric motor to one side of the bearing support means and upon the said over-hanging shaft extension and means for constraining one of said relatively movable parts against rotation.

JAMES W. COREY.
ALEXANDER M. MacCUTCHEON.